United States Patent Office 3,328,459
Patented June 27, 1967

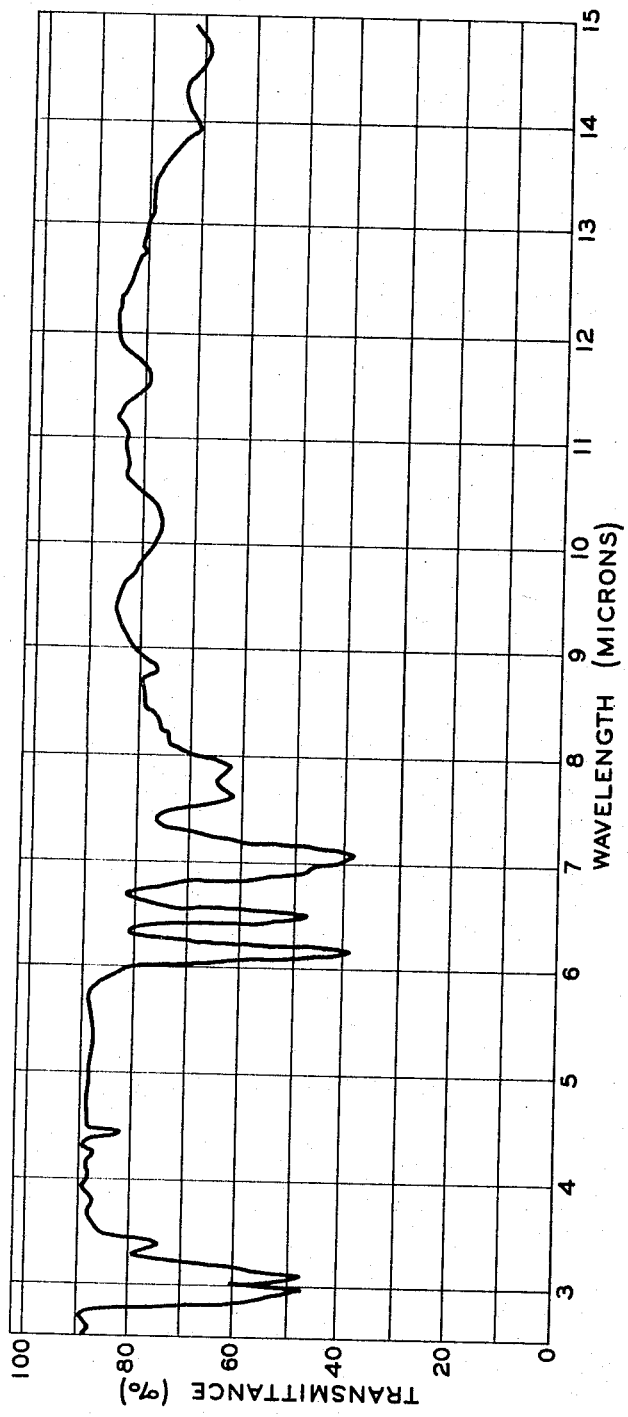

3,328,459
POLYMERIZATION OF MERCAPTO-SUBSTITUTED NITRILES
Rector P. Louthan, Bartlesville, Okla., assignor to Phillips Petroleum Company, a corporation of Delaware
Filed May 28, 1964, Ser. No. 370,862
7 Claims. (Cl. 260—465.5)

This application is a continuation-in-part of my copending application Ser. No. 278,445, filed May 6, 1963, now U.S. Patent 3,278,574.

This invetion relates to a process for polymerizing mercapto-substituted nitriles and to the polymers so obtained.

Mercapto-substituted nitriles are organic sulfur compounds of considerable industrial importance. I have discovered that these nitriles can be polymerized to form novel polymers.

Accordingly, an object of this invention is to provide a process for polymerizing mercapto-substituted nitriles, such as 3-mercaptopropionitrile. Another object is to provide polymerized mercapto-substituted nitriles. Another object is to provide a process for polymerizing mercapto-substituted nitriles, such as 3-mercaptopropionitrile. Further objects and advantages of this invention will become apparent to those skilled in the art from the following discussion and appended claims.

Briefly, I have discovered that mercapto-substituted nitriles can be polymerized by maintaining the same at a neutral or basic pH (e.g., 7.0 to 13.0) and at 0 to 150° C. for a few minutes to several days. Longer polymerization times will be required at the lower temperatures and vice versa. If a basic material is added to obtain basic conditions for polymerization, shorter polymerization reaction times and lower polymerization temperatures can be employed. Any suitable base can be employed to provide a basic pH, such as ammonia, primary, secondary, and tertiary amines, and alkali and alkaline earth metal hydroxides. Representative bases which can be used for this purpose include methylamine, dimethylamine, triethylamine, isopropylamine, pyridine, piperidine, sodium hydroxide, potassium hydroxide, rubidium hydroxde, cesium hydroxide, lithium hydroxide, calcium hydroxide, and the like.

Infrared and elemental analyses of the polymers of mercapto-substituted nitriles of this invention are consistent with the following general structural formula for these polymers

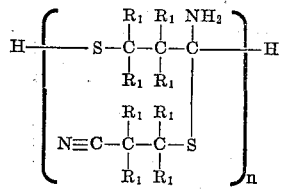

where:

$R_1$ is selected from the group consisting of hydrogen and lower alkyl hydrocarbon radicals, such as methyl, ethyl, propyl, and butyl radicals, $n$ is an integer resulting in the polymer having a viscosity of at least 9 poises at 25° C., and generally $n$ will be in the range of 2 to 100.

The polymer of 3-mercaptopropionitrile is typical of the novel polymers of this invention, and such polymer has the formula:

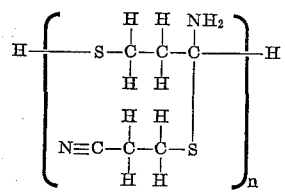

The presence of thioether groups and amino groups in the mercapto-substituted nitrile polymers of this invention makes them suitable for a variety of purposes, one especially useful application of these polymers being that of vulcanization accelerators.

The mercapto-substituted nitriles which can be polymerized according to the practice of this invention can be represented by the general formula:

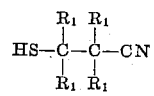

where:

$R_1$ is selected from the group consisting of hydrogen and lower alkyl hydrocarbon radicals, such as methyl, ethyl, propyl, and butyl radicals.

Representative mercapto-substituted propionitriles coming within the scope of the above general formula and which can be stabilized or polymerized according to the practice of this invention include: 3-mercaptopropionitrile, 2-methyl-3-mercaptopropionitrile, 3 - methyl-3-mercaptobutyronitrile, 3-t-butyl - 3 - mercaptobutyronitrile, 2,3-dimethyl-3-mercaptobutyronitrile, 3 - mercaptocapronitrile, 3-mercaptoenanthonitrile, 3-methyl - 2 - mercaptomethylvaleronitrile, 2-n-propyl-3-mercaptovaleronitrile, 3-methyl-3-mercaptovaleronitrile, 2,3 - di - n - butyl-3-mercaptoenanthonitrile, and the like.

The mercapto-substituted nitriles which are polymerized according to this invention can be prepared by known processes, but I prefer to prepare these mercapto-substituted nitriles by the process disclosed in copending application Ser. No. 278,401, filed May 6, 1963, now U.S. Patent 3,280,163 by R. P. Louthan et al., which copending application discloses the preparation of the mercapto-substituted nitriles by reaction of an unsaturated nitrile with hydrogen sulfide in the presence of a catalytic amount of sulfur.

The following examples further illustrate the objects and advantages of this invention, but it should be apparent that the various embodiments of this invention recited in these examples should not be construed so as to unduly limit this invention.

*Example I*

Two runs were carried out in which 3-mercaptopropionitrile was synthesized by the reaction of hydrogen sulfide with acrylonitrile.

In one of the runs, 12 moles of acrylonitrile, 24 g. of pyridine and 12 g. of sulfur were charged to a 1-gal. stainless steel autoclave equipped with a stirrer and an internal steam coil for maintaining the reaction temperature at the desired level. The reactor was then closed and pressured with 24 moles of hydrogen sulfide, after which the reaction mixture was heated to 85° C. The reaction mixture was periodically sampled, and the samples were analyzed by gas-liqiud chromatography for acrylonitrile content. All of the acrylonitrile had reacted within 15 min., so the reaction mixture was blown down hot from the autoclave. The reaction mixture was subjected to vacuum distillation in a steam jacketed distillation column, and after 1 hr., during which the pressure failed to drop below about 10 mm., it was determined that the lack of pressure drop was due to the decomposition of the 3-mercaptopropionitrile occurring at this temperature. Accordingly, 10 g. of p-toluenesulfonic acid monohydrate was added to the kettle of the distillation column. Shortly thereafter, 3-mercaptopropionitrile began distilling overhead, and a yield of 44.3 mol percent based on the acrylonitrile originally charged was obtained.

The above run was then repeated except that the 10 g. of p-toluenesulfonic acid monohydrate was added to the kettle of the distillation column at the time the reaction mixture was originally charged to the distillation column. No decomposition occurred during this run, and a yield of 62.5 mol percent of 3-mercaptopropionitrile was obtained, based on the acrylonitrile charge.

*Example II*

3-mercaptopropionitrile was prepared by reacting 636 g. of acrylonitrile and 816 g. of $H_2S$ at 85° C. for 5 hr. in the presence of 12 g. of sulfur. This material was fractionated, and a neutral pH sample of 3-mercaptopropionitrile, boiling at 70° C. at 5.75 mm. Hg absolute pressure and having a refractive index $n_D^{20}$ of 1.4863, was charged to a bottle and placed on a shelf for 6 days at about 25° C. At the end of this time, the mercapto-substituted nitrile had polymerized to a deep red, very viscous liquid.

The infrared spectrum of the 3-mercaptopropionitrile polymer was determined on an Infracord-Model 137 infrared spectrometer and such spectrum is illustrated in the attached drawing. In making the infrared analysis, a sample of the polymer was examined by forming a smear on a KBr pellet. Such analysis confirmed the presence of cyano, primary amino, and some mercapto groups. Specifically, the infrared spectrum showed the following features: a —NH stretching band at 3.0–3.1 microns; a C—H stretching at 3.4 microns; a —SH abosrption band at 3.8–3.9 microns; a C≡N absorption band at 4.4 microns; —NH deformation bands at 6.2 and 6.5 microns; and —C—N stretching and $CH_2$ deformation at 6.9–7.1 microns.

*Example III*

In another run, 3-mercaptopropionitrile was polymerized in the presence of triethylamine.

In this run, 800 g. of 3-mercaptopropionitrile and 8 g. of triethylamine were charged to a 2-liter, 3-necked flask equipped with a stirrer, thermometer, and jacket. The nitrile became cherry red immediately after charging the amine. The mixture was heated to 100° C. over about a 15 min. period by passing steam through the jacket surrounding the flask. After heating for about 30 min., the temperature of the reaction mixture began to increase slowly, and after about 10 min., the temperature reached about 115° C. The temperature was maintained between 100–105 for 1.5 hr. by passing a slow stream of water through the jacket. As the temperature began to fall, the cooling water was turned off, and the temperature was maintained at 100° C. for about 15 min. by passing steam through the jacket. The flask contents were then discharged and weighed, and 801.6 g. of very red viscous liquid was obtained. The viscosity of this material, after cooling to room temperature, was determined on a Gardner Bubble Viscometer and found to be 9 poises. The viscosity of this material was determined periodically and found to incerase over the next several weeks. The results of these viscosity tests are shown below in the form of a table.

TABLE I

| Day after polymerization: | Viscosity, poises |
|---|---|
| As recovered | 9 |
| 1 | 10.5 |
| 4 | 12.5 |
| 5 | 15.5 |
| 7 | 17.6 |
| 8 | 19 |
| 11 | 24 |
| 13 | 27 |
| 18 | 36 |
| 20 | 42 |
| 22 | 50 |
| 26 | 60 |
| 33 | 98 |
| 47 | 150 |

The molecular weight of the material having a viscosity of 150 poises was determined on a Mechrolab Osmometer and found to be 333, which indicates that $n$ in Formula II was about 2 for this polymer.

*Example IV*

A sample of redistilled 3-mercaptopropionitrile amounting to 104.6 g. was mixed with 0.5 g. of triethylamine. This material was maintained at 25° C. and after 2 days, the material had turned to a deep red viscous liquid. One week later it was attempted to strip any light material present by heating the viscous polymer to 100° C. in a rotating evaporator at a pressure of less than 1 mm. Hg absolute pressure. After heating for about 30 min. at these conditions, the weight of the materials remaining was 103.6 g. An elemental analysis of this polymer was then carried out and the results are as follows:

TABLE II

| Element | Wt. percent | |
|---|---|---|
| | Calculated for $C_3H_5NS$ | Found |
| Carbon | 41.35 | 41.6 |
| Hydrogen | 5.78 | 5.9 |
| Nitrogen | 16.07 | 14.7 |
| Sulfur | 36.80 | [1] 37.9 |

[1] By difference.

Various modifications and alterations of this invention will become apparent to those skilled in the art from the foregoing description and examples without departing from the scope and spirit of this invention, and it should be understood that this invention is not to be limited unduly to the illustrative embodiments of this invention set forth hereinbefore.

I claim:

1. A polymer having the following general formula

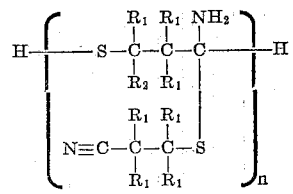

where $R_1$ is hydrogen or lower alkyl hydrocarbon radicals and $n$ is an integer in the range of 2 to about 100, said polymer having a viscosity of at least 9 poises at 25° C.

2. A polymer of 3-mercaptopropionitrile having a viscosity of at least 9 poises at 25° C. and characterized by infrared absorption bands at 3.0–3.1μ, 3.4μ, 3.8–3.9μ, 4.4μ, 6.2μ, 6.5μ, and 6.9–7.1μ.

3. A process for polymerizing a mercapto-substituted nitrile having the general formula

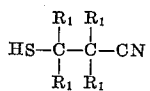

to prepare a polymer having the general formula

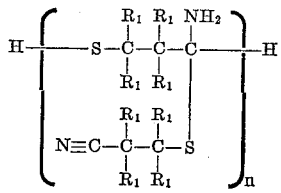

where $n$ is an integer in the range of 2 to about 100, said polymer having a viscosity of at least 9 poises at 25° C., where $R_1$ is hydrogen or lower alkyl hydrocarbon radicals, which comprises maintaining said nitrile at a pH in the range of 7.0 to 13.0 and at a temperature in the range of 0 to 150° C., and recovering the resulting polymer.

4. The process according to claim 3 wherein said nitrile is 3-mercaptopropionitrile.

5. A process for polymerizing 3-mercaptopropionitrile, to prepare a polymer having a viscosity of at least 9 poises at 25° C. and characterized by infrared absorption bands at 3.0–3.1μ, 3.4μ, 3.8–3.9μ, 4.4μ, 6.2μ, 6.5μ, and 6.9–7.1μ, which comprises admixing with said nitrile a basic material sufficient to render the pH of the resulting mixture between 7.0 to 13.0 and maintaining the mixture at a temperature in the range of 0 to 150° C., and recovering the resulting polymer.

6. The process of claim 5 wherein the basic material is ammonia, amines, alkali metal hydroxides or alkaline earth metal hydroxides.

7. The process according to claim 6 wherein said basic material is triethylamine.

References Cited
UNITED STATES PATENTS

| | | | |
|---|---|---|---|
| 2,429,452 | 10/1947 | Cass | 260—465.1 |
| 2,748,155 | 5/1956 | Wordie | 260—465.1 |
| 2,762,836 | 9/1956 | Selcer | 260—465.8 |

JOSEPH P. BRUST, *Primary Examiner.*

CHARLES B. PARKER, *Examiner.*